United States Patent
Burky et al.

(10) Patent No.: US 8,041,928 B2
(45) Date of Patent: Oct. 18, 2011

(54) INFORMATION HANDLING SYSTEM WITH REAL AND VIRTUAL LOAD/STORE INSTRUCTION ISSUE QUEUE

(75) Inventors: William E. Burky, Austin, TX (US); Kurt A. Feiste, Austin, TX (US); Dung Quoc Nguyen, Austin, TX (US); Balaram Sinharoy, Poughkeepsie, NY (US); Albert Thomas Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/341,930

(22) Filed: Dec. 22, 2008

(65) Prior Publication Data

US 2010/0161945 A1 Jun. 24, 2010

(51) Int. Cl.
*G06F 9/00* (2006.01)
(52) U.S. Cl. ......................................................... 712/225
(58) Field of Classification Search .................... 712/225
See application file for complete search history.

(56) References Cited

U.S. PATENT DOCUMENTS

| | | | |
|---|---|---|---|
| 5,454,091 A | | 9/1995 | Sites |
| 7,003,648 B2 * | | 2/2006 | Chrysos et al. ................. 712/26 |
| 7,062,636 B2 | | 6/2006 | Baxter |
| 7,330,963 B2 | | 2/2008 | Baxter |
| 7,600,099 B2 * | | 10/2009 | Le et al. ........................ 712/220 |
| 2003/0182537 A1 | | 9/2003 | Le |
| 2003/0182540 A1 * | | 9/2003 | Burky et al. ................... 712/225 |
| 2003/0225992 A1 | | 12/2003 | Venkatrao |
| 2005/0251660 A1 * | | 11/2005 | Bell et al. ...................... 712/225 |
| 2005/0251668 A1 * | | 11/2005 | Chaudhry et al. ............. 712/235 |

OTHER PUBLICATIONS

Biswas—"Attribute Allocation in Large Scale Sensor Networks"—OBR Research Center for Distributed and Mobile Computing, Dept of ECECS, University of Cincinnati (Apr. 2005).
Kumar—"Express Virtual Channels: Towards the Ideal Interconnection Fabric"—Dept. of Electrical Engineering, Princeton University, P:rinceton NJ (Jun. 2007).
Zhou-1—"Heterogeneously Tagged Caches for Low-Power Embedded Systems with Virtual Memory Support"—University of Maryland, College Park (Apr. 2008).
Zhou-2—"Energy-Efficient Address Translation for Virtual Memory Support in Low-power and Real-Time Embedded Processors"—University of Maryland, College Park (Sep. 2005).

* cited by examiner

*Primary Examiner* — Jacob A Petranek
(74) *Attorney, Agent, or Firm* — Stephen J. Walder, Jr.; Diana R. Gerhardt (57) ABSTRACT

An information handling system includes a processor that may perform issue queue virtual load/store instruction operations. The issue queue maintains load and store instructions with a real/virtual dependency flag. The issue queue provides storage resources for real and virtual load/store instructions. Real load/store instructions execute in a load store unit LSU. Virtual load/store instructions are pending execution in the LSU. The LSU may keep track of each virtual load/store instruction within the issue queue by thread, type, and pointer data. Provided that all dependencies are clear for a pending virtual load/store instruction, the LSU marks the pending virtual load/store instruction as real. The pending virtual load/store instruction may then issue to the LSU as a real load/store instruction.

20 Claims, 5 Drawing Sheets

INFORMATION HANDLING SYSTEM WITH REAL AND VIRTUAL LOAD/STORE INSTRUCTION ISSUE QUEUE

This invention was made with United States Government support under Agreement No. HR0011-07-9-0002 awarded by DARPA. The Government has certain rights in the invention.

BACKGROUND

The disclosures herein relate generally to processors, and more specifically, to processors that employ instruction issue queue dependency management for load and store instructions.

Modern information handling systems (IHSs) may include load and store instructions within an instruction issue queue that a processor fetches and decodes from an instruction data stream. A processor load/store unit (LSU) executes the load and store instructions as they issue from the issue queue. Issue queue and LSUs maintain a finite amount of storage space for instruction data. Processors manage the storage limitations for load and store instructions by limiting the allocation of LSU entries. Processors monitor LSU instruction execution status to determine when a new load or store instruction may issue from the issue queue into the LSU.

Because out-of-order instruction handling is common in modern IHSs, processors typically track the dependencies between instructions pending issue in the instruction issue queue. A particular instruction may not issue until dependencies for that particular instruction are met. Those dependencies may include data dependencies, address dependencies, and other dependencies. When each of the particular instruction dependencies clear, that particular instruction may issue to an execution unit, such as the LSU within the processor, for further processing.

BRIEF SUMMARY

Accordingly, in one embodiment, a method of operating a processor, is provided. The method includes fetching, by a fetch unit, a plurality of instruction threads, the instruction threads including load/store instructions. The method also includes decoding, by a decode unit, the load/store instructions. The method further includes dispatching, by a dispatch unit, each of the load/store instructions to an issue queue depending on availability of space in the issue queue. The method still further includes designating, by the issue queue, each of the load/store instructions in the issue queue as being a real load/store instruction or a virtual load/store instruction via a respective real/virtual indicator for each load/store instruction. The method may also include issuing, by the issue queue, the real load/store instructions in the issue queue to a load/store unit until the load/store unit is full.

In another embodiment, a processor is disclosed that includes a fetch unit that fetches a plurality of instruction threads, the instruction threads including load/store instructions. The processor also includes a decode unit, coupled to the fetch unit, that decodes, the load/store instructions. The processor further includes a dispatch unit, coupled to the decode unit, that dispatches the load/store instructions. The processor still further includes an issue queue, coupled to the dispatch unit, wherein the dispatch unit dispatches each of the load/store instructions to the issue queue depending on availability of space in the issue queue. The issue queue designates each of the load/store instructions in the issue queue as being a real load/store instruction or a virtual load/store instruction via a respective real/virtual indicator for each load/store instruction. The processor also includes a load/store unit, coupled to the issue queue, that executes load/store instructions issued by the issue queue. The issue queue may issue the real load/store instructions in the issue queue to the load/store unit until the load/store unit is full.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Modern processors often use issue queues to temporarily manage the issue, dependency factors, and other parameters of processor instructions. Load and store or load/store instructions may issue to a load/store unit (LSU) for execution. A processor may group instructions by a particular thread. For example, in a multi-tasking processor, multiple threads, programs, or groups of instructions may execute in parallel without overlap of system resources, such as memory locations and other resources. The processor may require substantial resources to manage the parallel processing of multiple threads at the same time. For example, a processor may allocate a fixed amount of issue queue storage for thread 0, and another fixed amount of issue queue storage for thread 1. This is a "fixed allocation" of issue queue storage resources for multiple threads.

At a particular time, thread 0 may require more allocation of issue queue storage resources, and thread 1 may not be using all of its allocation resources. However, in a fixed allocation methodology, the thread 1 issue queue allocation is not available for use by thread 0 even if those resources for thread 1 are idle. This fixed or static allocation method may be coincident with static allocation of LSU resources as well. Since LSU resources have a finite amount of storage capacity, those resources may model after the static issue queue allocations for each thread or group of instructions.

In one embodiment, the processor provides a real/virtual flag within the issue queue to identify which load/store instructions are eligible for execution within the LSU, and which load/store instructions are pending issue to the LSU by the issue queue. The processor employs an allocation methodology for pending load or store instruction entries in the LSU for execution. The pending load/store instructions are herein referred to as virtual load/store instructions. As used herein the term "virtual load/store instructions" refers to load/store or load and store instructions within the issue queue waiting for an LSU load or store entry allocation. An LSU entry allocation provides a load or store instruction eligibility for issue queue instruction issue.

Load/store instructions that include a dependency flag, such as a real/virtual flag that is equal to 1 are "real" instructions executing within the LSU. Alternatively, load/store instructions that exhibit a dependency flag, such as a real/virtual flag that is equal to 0 are "virtual" instructions pending execution in the LSU. In other words, the load/store instructions waiting for a load or store entry allocation within the LSU are virtual load/store instructions. The processor employs dependency flags, such as register dependency flags, and other flags to determine load/store instruction issue eligibility. When all such dependencies fulfill or clear, including the dependency which indicates a load/store instruction is "real", then the instruction is eligible to issue. Real load/store instructions include those instruction that have an LSU available entry.

The processor may position virtual load/store instructions pending LSU execution in order of age within the issue queue. For example, multiple virtual load/store instructions that correspond to multiple threads may by all vie for the same LSU resources. The processor may allocate the LSU resources or real entries for each thread on a "round robin" or other basis, and determine virtual load/store instruction eligibility by using a number of instruction dependency factors, such as age, data dependencies, address dependencies, real/virtual flag status, and others. When the processor allocates a real LSU entry to a thread, the virtual pointer for that thread is broadcast to the issue queue along with a thread identifier (ID). The thread ID provides processor resources with thread to thread identification.

The issue queue compares the thread ID along with the virtual pointer value with all the entries in the issue queue. In one embodiment, the processor identifies the next load/store instruction to issue as the instruction that the issue queue last converted from virtual to real. The issue queue increments the pointer for the thread and type of instruction with matching thread ID to the next load/store instruction. In this manner, the processor converts the virtual load/store instruction to a real load/store instruction. The issue queue may issue the real load/load store instructions as well as other instructions to the LSU or other execution units as dependencies clear for any particular instruction.

In another embodiment, the disclosed processor may employ an instruction issue unit (ISU) that maintains separate head, virtual, and tail pointers for independent load and store instructions within a particular thread. A load/store tag unit (LSTAG) manages the instruction thread, type, and pointer data called an instruction tag. In other words, the ISU maintains tag pointer records for each instructional thread and load/store instruction, by use of head, virtual, tail pointer data as described in more detail below. A load reorder queue (LRQ) and store reorder queue (SRQ), provide the LSU execution instruction storage locations for the executing load/store instructions.

Figure 1:
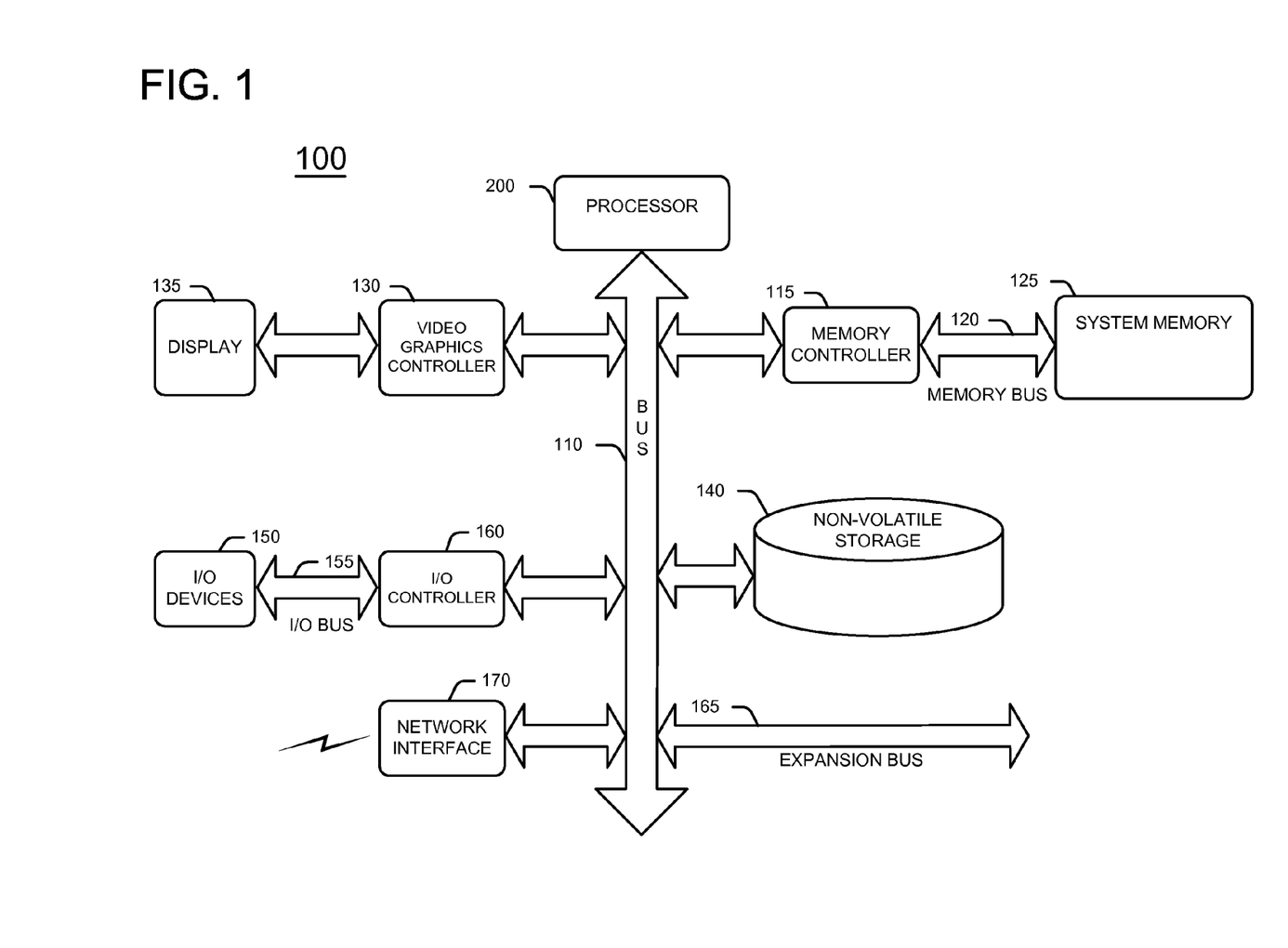
FIG. 1 is block diagram of an information handling system (IHS) that includes the disclosed processor issue queue virtual load/store instruction methodology.

FIG. 1 shows an information handling system (IHS) 100 that may employ the disclosed issue queue virtual load/store instruction method. IHS 100 includes a processor 200 that couples to a bus 110. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

Figure 2:
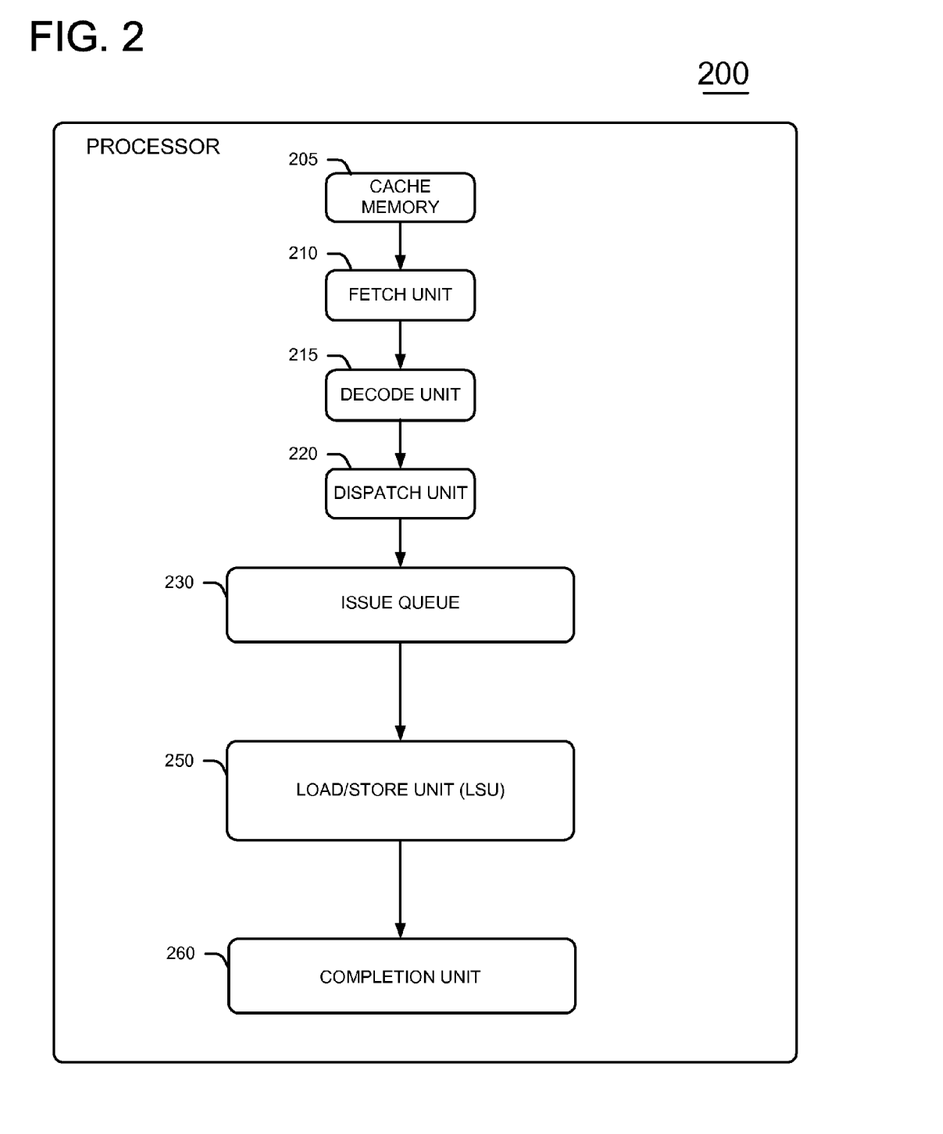
FIG. 2 is a block diagram showing more detail of the processor that employs the issue queue virtual load/store instruction methodology.
Figure 4A:
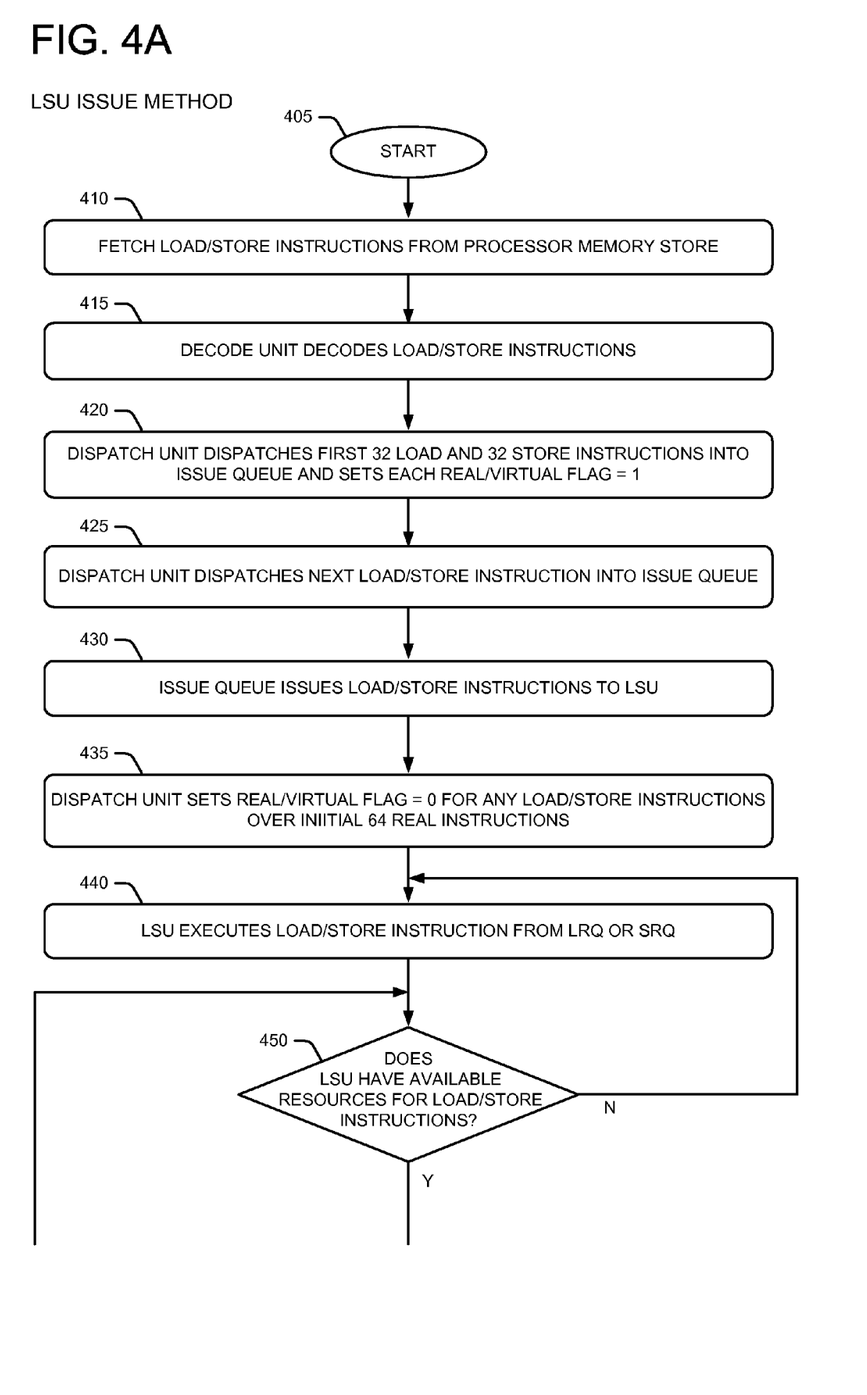
FIG. 4A-4B is a flowchart that shows process flow in the processor of FIG. 2 as it employs the disclosed issue queue virtual load/store instruction method.
Figure 4B:
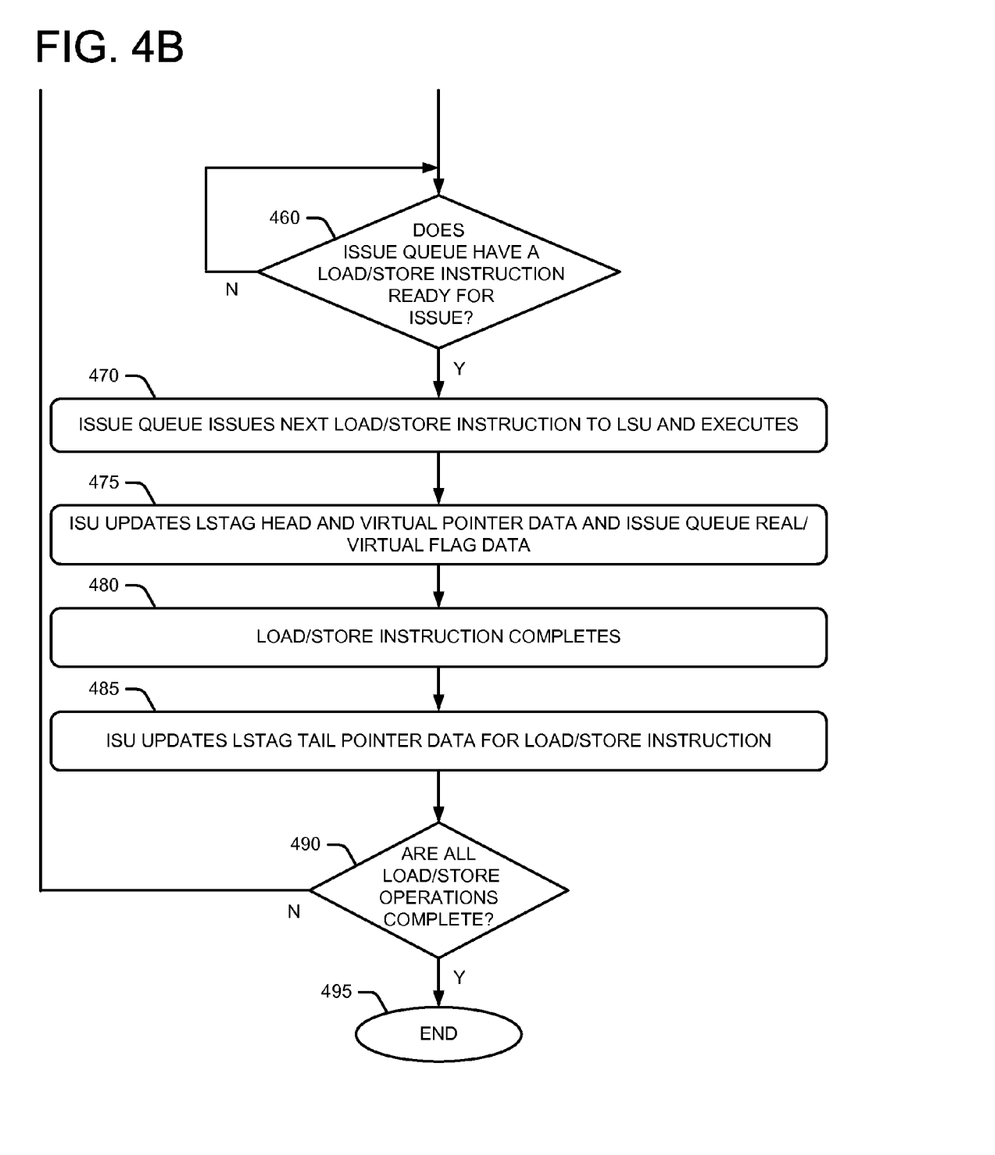

FIG. 2 shows a processor 200 that may employ the disclosed issue queue virtual load/store instruction method. In that case, processor 200 performs the functional blocks of the flowchart of FIG. 4 described below that apply to the issue queue virtual load/store instruction process. Processor 200 includes a cache memory 205 that may receive processor instructions from system memory 125, non-volatile storage 140, expansion bus 165, network interface 170, or other sources not shown in FIG. 2. Cache memory 205 couples to a fetch unit 210 that processor 200 employs to fetch multiple instructions from cache memory 205. Instructions may be in the form of an instruction stream that includes a series or sequence of processor program instructions. These instructions may include load/store instructions that require LSU execution. Instructions may include a thread relationship, such that each instruction belongs to a particular thread or program group. A multi-tasking processor may execute multiple threads concurrently. For example, the processor may execute thread 0, thread 1, thread 2, and thread 3 at the same time within the constraints of the processor resources.

Fetch unit 210 couples to a decode unit 215 that provides decoding of instructions as resources of processor 200 become available. Decode unit 215 decodes and identifies load and store instructions. Decode unit 215 couples to a dispatch unit 220. Dispatch unit 220 couples to an issue queue 230. Issue queue 230 couples to a load/store unit (LSU) 250. Issue queue 230 maintains instructions for issue to execution units, such as LSU 250. Issue queue 230 maintains instruction tag (ITAG) information as described in more detail below. LSU 250 is an execution unit that executes load/store instructions. LSU 250 couples to a completion unit 260. Completion unit 260 provides processor 200 with resources to re-order instructions after execution into the original sequence program order prior to dispatch.

Figure 3:
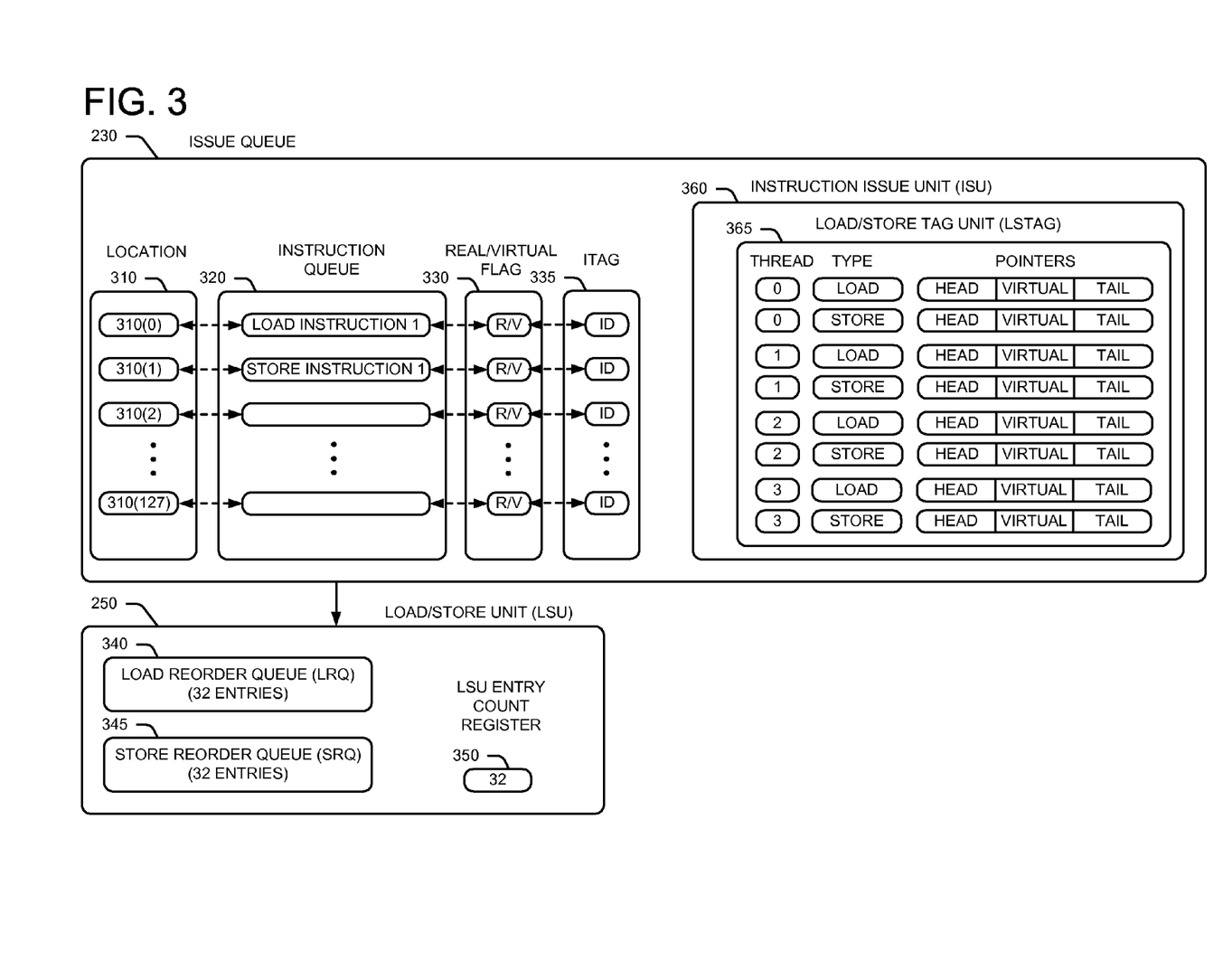
FIG. 3 depicts more detail of the issue queue and load/store unit (LSU) that employs the issue queue virtual load/store instruction methodology.

FIG. 3 shows more detail of issue queue 230 and LSU 250 that may employ the disclosed issue queue virtual load/store instruction method. Issue queue 230 includes storage of processor instruction data. In one embodiment, issue queue 230 may include 128 locations, shown as locations 310, for load and store instructions. In this example, issue queue 230 includes an instruction queue 320 that includes storage locations for up to 128 instructions or entries. Other embodiments may include different location 310 sizing and orientations.

Issue queue 230 stores a real/virtual flag 330 for each location 310 and corresponding instruction in instruction queue 320. The real/virtual flag 330 data or "RN" bit may provide one example of dependency data for a particular instruction within instruction queue 320. For example in location 0 of issue queue 230, instruction queue 320 includes a load instruction 1. The real/virtual flag corresponding to load instruction 1 is set to 1 which represents a real dependency or ready flag setting for that instruction. The real/virtual flag is described in more detail below. Each entry or location 310 within instruction queue 320 also includes an instruction tag (ITAG) 335. Processor 200 uses ITAG 335 data during analysis of load/store instruction eligibility and tracking for issue to LSU 250 for execution.

In one embodiment, issue queue 230 provides storage for real load/store instruction data and virtual load/store instruction data. The real/virtual flag 330 may identify those load/store instructions within issue queue 230 that are eligible to issue to LSU 250. A load/store instruction that includes a real/virtual flag equal to 0 is a virtual load/store instruction. Any particular virtual load/store instructions may take any real location within LSU 250 as space becomes available, and also as all other dependencies for that particular load/store instruction clear.

LSU 250 includes a load reorder queue (LRQ) 340 and store reorder queue (SRQ) 345. A load/store reorder queue includes both LRQ 340 and SRQ 345. LRQ 340 provides storage for load instructions during execution by LSU 250. In a similar manner, SRQ 345 provides storage for store instructions during execution by LSU 250. In one embodiment, LRQ 340 and SRQ 345 each include 32 locations for load and store instructions. For example, load instruction 1 in location 310(0) of instruction queue 320, may issue from issue queue 230 to LSU 250 to provide LRQ 340 with instruction data. In a similar manner, store instruction 1 in location 310(1) of instruction queue 320, may issue from issue queue 230 to LSU 250 to provide SRQ 345 with instruction data Although other embodiments may provide different sizes or location counts for LRQ 340 and SRQ 345 data, the fixed number of location counts offers a limitation for LSU 250 storage in each case. LSU 250 provides a reservation or dedication of storage location or address space for real load/store instructions, such as load instruction 1, and store instruction 1. Along with other information, LSU 250 may maintain an LSU entry count register 350. The LSU entry count register 350 provides LSU 250 with the size or number of locations for LRQ 340 and SRQ 345. This information provides processor 200 with proper sizing and LSU 250 queue limitations on queue sizes for load/store instructions. In one embodiment, the number of LRQ 340 load and SRQ 345 store locations is equal to 32. In other words, at any particular time, processor 200 may employ LSU 250 to provide execution capability for 32 load and 32 store instructions within LSU 250.

ISU 360 includes a load/store tag (LSTAG) 365. LSTAG 365 provides processor 200 with virtual load/store instruction pointers or tag data for each thread executing within issue queue 230. LSTAG 365 provides a reservation or dedication of LSU 250 resources for the tracking and organization of virtual load/store instructions of issue queue 230. In one embodiment, dispatch unit 220 populates issue queue 230 with 128 load/store instructions. Those 128 load/store instructions correspond to locations 310(0) through 310(127) of instruction queue 320. Issue queue 230 sets each real/virtual flag for locations of instruction queue 320 containing real instructions equal to 1.

The real/virtual flag set to 1 identifies those load/store instructions that issue to LSU 250. Any subsequent load/store instructions may still dispatch from dispatch unit 220 into issue queue 230 and mark the real/virtual flag equal to 0, indicating that each of the virtual load/store instructions may not execute within LSU 250 until resources are available. While dispatch unit 220 populates issue queue 230 with virtual load/store instructions, ISU 360 employs LSTAG 365 to keep track of the aging, location, as well as other information regarding each virtual load/store instruction within issue queue 230.

LSTAG 365 maintains pointer data for each thread ID and load/store instruction type. In one embodiment, processor 200 employs 4 threads, namely thread 0, thread 1, thread 2, and thread 3. LSTAG 365 maintains a record of data independently for load and store instructions for each thread. For example, LSTAG 365 includes a record of pointer data for thread 0 and virtual load type or load instructions. LSTAG 365 includes a record of pointer data for thread 0 and virtual store type or store instructions. A virtual load or virtual store instructions is a load/store instruction within issue queue 230 with a real/virtual flag equal to 0. In other words, virtual load or virtual store instructions include those instructions pending operation in LSU 250. In a manner similar to the thread 0 pointer data case discussed above, LSTAG 365 maintains pointer data for threads 1 through 3. LSTAG 365 may include pointer data for load and store instructions for all threads in operation within processor 200.

The head, virtual and tail pointer data for each thread within LSTAG 365 provides a tracking or addressing mechanism to keep track of the next virtual load or store instruction pending LSU 250 execution. In one embodiment, processor 200 uses a "round robin" scheduling approach to provide each thread an equal opportunity for LSU 250 resources. When a resource or location within LSU 250 opens up or becomes free, processor 200 offers that location to the next thread requesting an LSU operation. In other words, the next pending virtual load/store instruction residing in issue queue 230 may issue for execution to LSU 250 when all dependency flags are met with the exception of the real/virtual flag 330 dependency data.

When LSU 250 provides an available resource or location for execution, processor 200 sets the real/virtual flag 330 for the next virtual load/store instruction within issue queue 230 equal to 1. In this manner the next virtual load/store instruction issues, and processor 200 updates all head, virtual, and tail pointer data for that corresponding thread information in LSTAG 365. In one embodiment, when the real/virtual flag for a particular load/store instruction changes from virtual to real, that particular load/store instruction is now ready for issue to LSU 250.

The head pointer data provides information regarding the aging and more specifically the order of dispatch for each thread type, namely load or store instructions. The virtual pointer data provides information regarding the next virtual load or store instruction eligible for issue or execution in LSU 250. The tail pointer data provides information regarding the tag of the oldest load and store instructions within issue queue 230. For example, the tail pointer may increment one location 310 as each load/store instruction completes in order. ISU 360 may use the head and tail pointers to determine how many virtual load/store instructions are pending execution. When a particular thread desires a virtual load/store instruction issue, the thread effectively requests a real tag. Processor 200 receives the real tag when the particular thread virtual load/store instruction converts that particular instructions real/virtual flag 330 from 0 to 1 or from virtual to real. In this manner, processor 200 receives the real tag from the requesting thread, and the particular virtual load/store instruction converts to a real load/store instruction and issues to LSU 250.

FIG. 4A-4B shows a flowchart that describes one example of the disclosed issue queue virtual load/store instruction method. The issue queue virtual load/store instruction method starts, as per block 405. Fetch unit 210 fetches instructions from processor 200 memory stores, as per block 410. Fetch unit 210 may fetch instructions from cache memory 205, system memory 125, non-volatile storage 140, expansion bus 165, network interface 170, or other memory stores of processor 200 not shown. Decode unit 215 decodes load and store or load/store instructions, as per block 415.

Load/store instructions may require LSU 250 execution for memory load/store operations. Dispatch unit 220 dispatches the first 32 load and 32 store instructions into issue queue 230 and sets each real/virtual flag 330=1, as per block 420. The real/virtual flag 330 provides each issue queue entry, a "real" load/store instruction status. Each real load/store instruction corresponds to an entry with LSU 250 specifically in the LRQ 240 and SRQ 245. Dispatch unit 220 dispatches the next load/store instruction into issue queue 230, as per block 425. In one embodiment, issue queue 230 provides storage locations for 32 "real" store and 32 "real" load instructions. Issue queue 230 also provides storage locations for 64 "virtual" load/store instructions.

Issue queue 230 issues load/store instructions to LSU 250, as per block 430. Each "real" load/store instruction, namely those instructions of issue queue 230 with a real/virtual flag=1, issues to LSU 250. Dispatch unit 220 sets the real/virtual flag 330=0 for any load/store instruction after the initial 32 real load instructions and 32 real store instructions, as per block 435. Any load or store instruction that dispatches after the initial 32 instructions of that type, namely load or store, are "virtual" load/store instructions. These instructions are virtual load/store instructions because they are not yet eligible for execution within LSU 250. In other words, the virtual load/store instructions are pending issue to LSU 250 for execution. LSU 250 executes either a load instruction or store instruction from LRQ 340, or SRQ 345 respectively, as per block 440.

LSU 250 executes load/store instructions within LSU 250 as execution resources become available within processor 200. Processor 200 performs a test to determine if LSU 250 currently has available resources for load/store instructions, as per block 450. In other words, "available resources" refers to available stores or storage locations for new instructions. If there are no available storage resources in LSU 250, LSU 250 continues executing load/store instructions, as per block 440. However if there are available storage resources in LSU 250, processor 200 performs a test to determine if issue queue 230 has a load/store instruction ready for issue, as per block 460. If all dependencies for a particular load/store instruction within issue queue 230 are clear, that particular load/store instruction is issue ready.

If issue queue 230 does not have a load/store instruction ready for issue, processor 200 continues testing for issue ready load/store instructions, as per block 460. However, if issue queue 230 has a load/store instruction ready for issue, issue queue 230 issues the next load/store instruction to LSU 250 for execution, as per block 470. ISU 360 determines the next load/store instruction availability by analysis of load/store instruction dependency flags. The real/virtual flag 330 is one example of an issue queue 230 dependency flag. Other dependency flags include data dependency, address dependency, and other dependency flag data not shown. ISU 360 updates LSTAG 365 head, virtual pointers, and issue queue 230 real/virtual flag 330 data, as per block 475.

After each load/store instruction issues from issue queue 230, ISU 360 updates LSTAG 365 pointers for the relative thread to that instruction. After a particular load/store instruction issues, the particular load/store instruction completes, as per block 480. The ISU 360 updates LSTAG 365 tail pointer data for the particular load/store instruction, as per block 485. Processor 200 performs a test to determine if all load/store instruction operations are complete, as per block 490. If load/store instruction operations are not complete, processor 200 performs a test to determine if LSU 250 has available resources for load/store instructions, as per block 450. However if load/store instruction operations are complete, the issue queue virtual load/store instruction method ends, as per block 495.

The foregoing discloses methodologies wherein a processor may employ issue queue virtual load/store instruction operations after load/store instruction fetch operations. A decode unit interprets load/store instructions from a fetch unit and provides the instructions with thread grouping to a dispatch unit. The dispatch unit dispatches load/store instruction into an issue queue as storage space is available. If the processor allocates all of the LSU entries within the LRQ, the load instructions dispatch as virtual. If the processor allocates all of the LSU entries within the SRQ, the store instructions dispatch as virtual. If there are LSU entries available, and no threads have outstanding virtual instructions, then the load/store instructions dispatch as real.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a processor, comprising:
    fetching, by a fetch unit, a plurality of instruction threads, the instruction threads including load/store instructions;
    decoding, by a decode unit, the load/store instructions;
    dispatching, by a dispatch unit, each of the load/store instructions to an issue queue depending on availability of space in the issue queue;
    designating, by the issue queue, each of the load/store instructions in the issue queue as being a real load/store instruction or a virtual load/store instruction via a respective real/virtual indicator for each load/store instruction; and
    populating a load/store tag unit, with head, virtual and tail pointer information to indicate a next virtual load/store instruction in the issue queue to become a real load/store instruction and issue from the issue queue to a load/store unit.

2. The method of claim 1, further comprising:
    issuing, by the issue queue, the real load/store instructions in the issue queue to a load/store unit until the load/store unit is full.

3. The method of claim 1, further comprising executing, by the load/store unit, a next load/store instruction in the load/store unit, thus providing results.

4. The method of claim 3, further comprising updating, by the processor, the head, virtual and tail pointer information and issue queue real/virtual indicator after the executing.

5. The method of claim 4, wherein the head, virtual and tail pointer information indicates a next virtual load/store instruction.

6. The method of claim 1, wherein the load/store unit includes a load/store reorder queue that tracks load/store instructions that are designated as real.

7. The method of claim 1, wherein the load/store tag unit, tracks load/store instructions that are designated as virtual.

8. A processor, comprising:
- a fetch unit that fetches a plurality of instruction threads, the instruction threads including load/store instructions;
- a decode unit, coupled to the fetch unit, that decodes, the load/store instructions;
- a dispatch unit, coupled to the decode unit, that dispatches the load/store instructions;
- an issue queue, coupled to the dispatch unit, wherein the dispatch unit dispatches each of the load/store instructions to the issue queue depending on availability of space in the issue queue, the issue queue designating each of the load/store instructions in the issue queue as being a real load/store instruction or a virtual load/store instruction via a respective real/virtual indicator for each load/store instruction;
- a load/store unit, coupled to the issue queue, that executes load/store instructions issued by the issue queue; and
- a load/store tag unit, wherein the processor populates the load/store tag unit with head, virtual and tail pointer information to indicate a next virtual load/store instruction in the issue queue to become a real load/store instruction and issue from the issue queue to the load/store unit.

9. The processor of claim 8, wherein the issue queue issues the real load/store instructions in the issue queue to a load/store unit until the load/store unit is full.

10. The processor of claim 8, wherein the load/store unit executes a next load/store instruction in the load/store unit, thus providing results.

11. The processor of claim 8, wherein the processor updates, the head, virtual and tail pointer information and issue queue real/virtual indicator after the load/store unit executes the next load/store instruction.

12. The processor of claim 11, wherein the head, virtual and tail pointer information indicates a next virtual load/store instruction.

13. The processor of claim 8, wherein the load/store unit includes a load/store reorder queue that tracks load/store instructions that are designated as real.

14. The processor of claim 8, wherein the load/store tag unit, tracks load/store instructions that are designated as virtual.

15. An information handling system (IHS), comprising:
- a memory;
- a processor, coupled to the memory, the processor including:
  - a fetch unit that fetches a plurality of instruction threads from the memory, the instruction threads including load/store instructions;
  - a decode unit, coupled to the fetch unit, that decodes, the load/store instructions;
  - a dispatch unit, coupled to the decode unit, that dispatches the load/store instructions;
  - an issue queue, coupled to the dispatch unit, wherein the dispatch unit dispatches each of the load/store instructions to the issue queue depending on availability of space in the issue queue, the issue queue designating each of the load/store instructions in the issue queue as being a real load/store instruction or a virtual load/store instruction via a respective real/virtual indicator for each load/store instruction;
  - a load/store unit, coupled to the issue queue, that execute load/store instructions issued by the issue queue; and
  - a load/store tag unit, wherein the processor populates the load/store tag unit with head, virtual and tail pointer information to indicate a next virtual load/store instruction in the issue queue to become a real load/store instruction and issue from the issue queue to the load/store unit.

16. The IHS of claim 15, wherein the issue queue issues the real load/store instructions in the issue queue to a load/store unit until the load/store unit is full.

17. The IHS of claim 15, wherein the load/store unit executes a next load/store instruction in the load/store unit, thus providing results.

18. The IHS of claim 17, wherein the processor updates the head, virtual and tail pointer information and issue queue real/virtual indicator after the executing, and wherein the head, virtual and tail pointer information indicates a next virtual load/store instruction.

19. The IHS of claim 15, wherein the load/store unit includes a load/store reorder queue that tracks load/store instructions that are designated as real.

20. The IHS of claim 15, wherein the load/store tag unit tracks load/store instructions that are designated as virtual.

* * * * *